United States Patent [19]

Sheek et al.

[11] Patent Number: 4,776,533
[45] Date of Patent: Oct. 11, 1988

[54] AIRCRAFT SEAT TRACK FITTING ASSEMBLY

[75] Inventors: R. Steven Sheek; Ralph G. Marrujo, both of Winston-Salem, N.C.

[73] Assignee: The Jepson Burns Corporation, Winston-Salem, N.C.

[21] Appl. No.: 28,490

[22] Filed: Mar. 20, 1987

[51] Int. Cl.⁴ .............................................. B64D 11/06
[52] U.S. Cl. .................................. 244/118.6; 410/115; 410/113; 248/503.1
[58] Field of Search .............. 244/118.6, 118.1, 118.5; 410/115, 101, 104, 105, 113; 403/121, 157, 2; 248/503.1, 554

[56] References Cited

U.S. PATENT DOCUMENTS

| | | | |
|---|---|---|---|
| 3,495,859 | 2/1970 | Hassan | 403/157 |
| 3,727,862 | 4/1973 | Kaufhold et al. | 244/554 |
| 4,139,245 | 2/1979 | McCloskey | 403/157 |
| 4,230,432 | 10/1980 | Howell | 248/503.1 |
| 4,396,175 | 8/1983 | Long | 248/503.1 |

Primary Examiner—Galen Barefoot
Attorney, Agent, or Firm—Mark I. Feldman

[57] ABSTRACT

An improved seat fitting assembly has an impact resistant construction to increase the safety, stability, longevity, and reliability of passenger seat equipment. The fittings has specially designed outer openings to accommodate normal loads, rotation of the track or seat, and bending of the fastener. The fitting can be equipped with a bushing and can comprise a composite body.

9 Claims, 3 Drawing Sheets

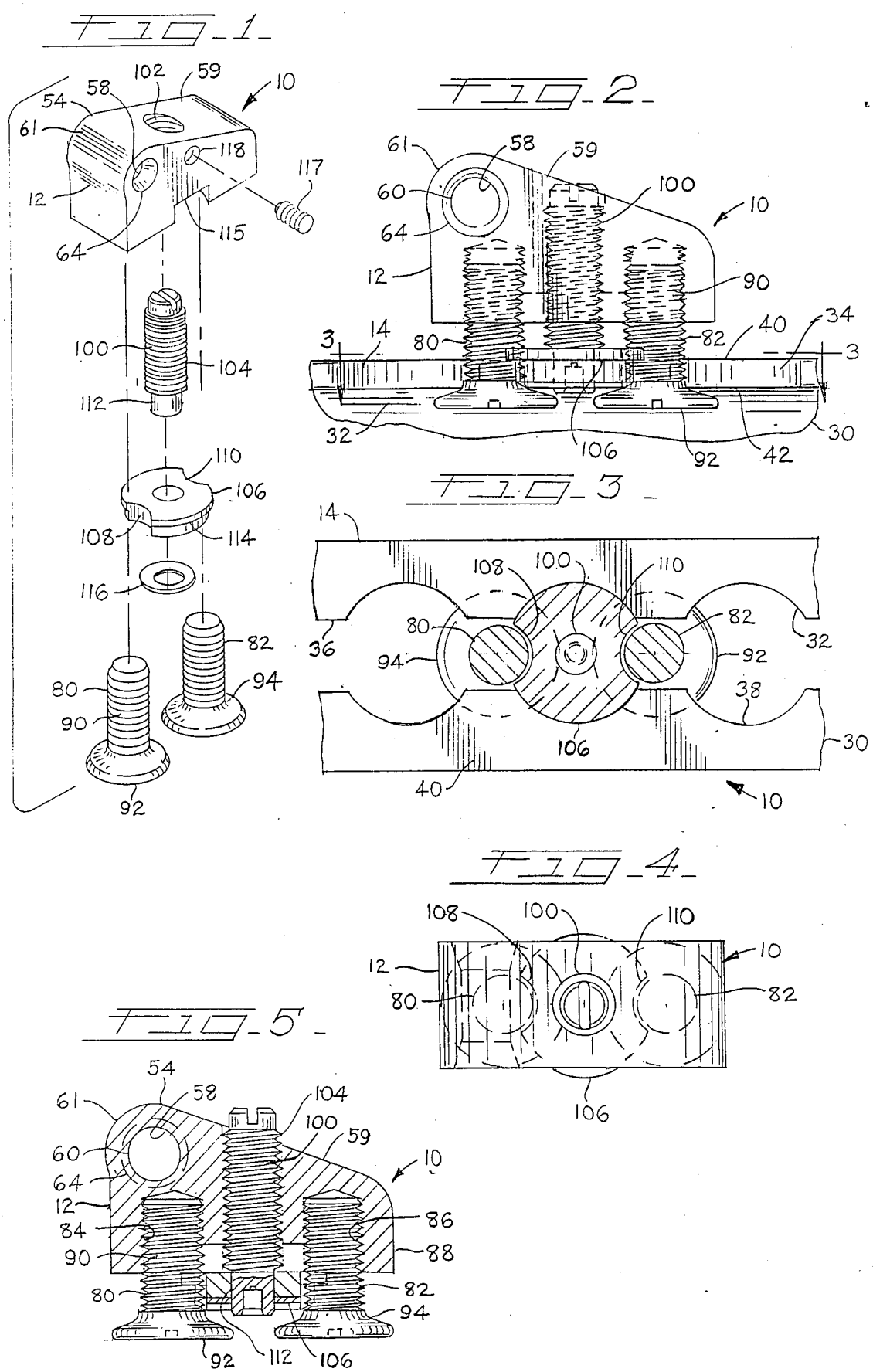

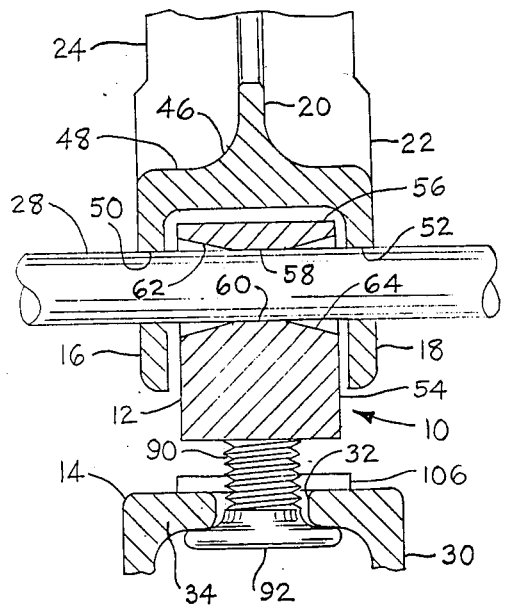
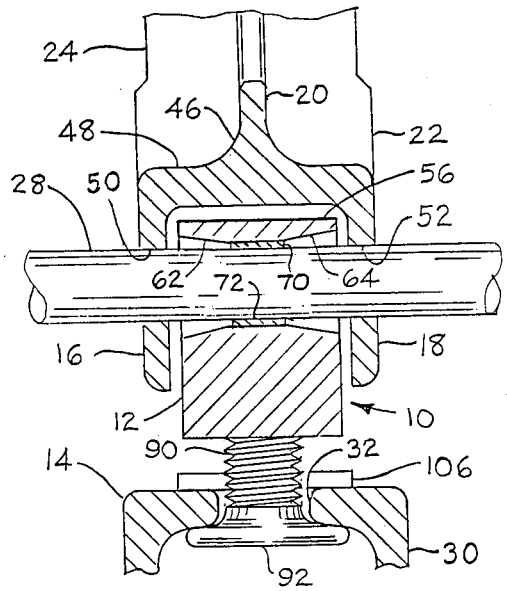
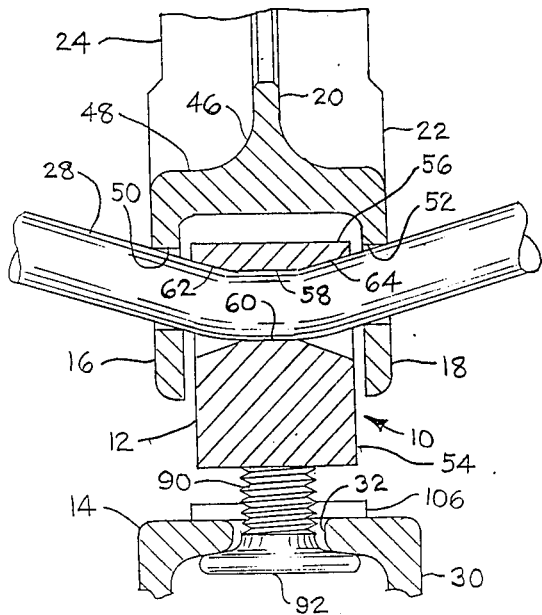
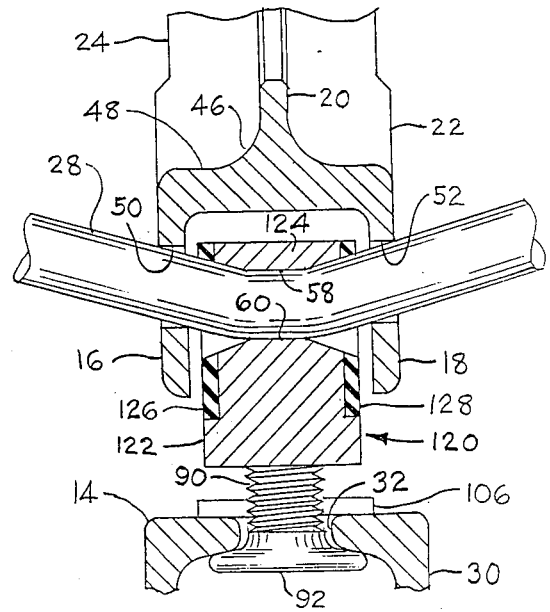

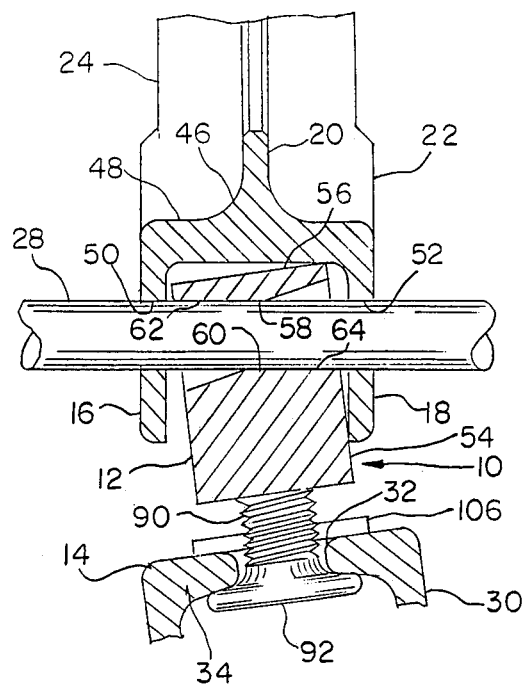
FIG-10-
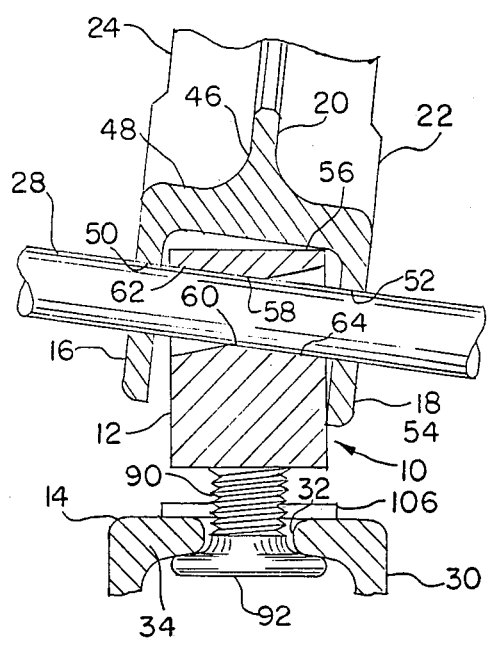
FIG-11-

AIRCRAFT SEAT TRACK FITTING ASSEMBLY

BACKGROUND OF THE INVENTION

This invention pertains to aircraft passenger seat equipment and, more particularly, to an aircraft seat fitting assembly.

In aircraft, trains, buses, and ships, it is desirable to safely secure individual and bench style passenger seats, as well as cargo and other items, at predetermined staggered locations along the floor (deck) of the aircraft. This is often accomplished with tracks, track fittings, and bolts. Track fittings and bolts must have sufficient strength, reliability, and load-carrying capacity to assure that the passenger seats and other loads do not become loose during travel, which could endanger passengers and personnel and damage the cargo and aircraft equipment. It is also desirable that the track fitting be relatively easy to attach and detach from the track to permit versatility in positioning the passenger seats and in converting and changing the passenger and cargo-carrying space of the aircraft.

Aircraft often need the capability to add, remove, or change the positions of passenger seats and cargo to accommodate more or fewer passengers or larger or smaller amounts of cargo. For example, it is often desirable to change the density of loading of an aircraft from first class, business, and tourist loading configurations to an all discount or charter operation having entirely or mostly economy or tourist seats. Furthermore, some flights, especially those that are scheduled late at night, may have their passenger and cargo compartments rearranged to accommodate both cargo and passengers in the compartment that is normally reserved for only passenger seats.

In order to accomplish the above, aircraft manufacturers and suppliers have installed locking tracks that run lengthwise in the floor of the major compartment of the aircraft. Such locking tracks usually have a slot or channel along their entire length. The tracks typically also have semicircular cutout portions that extend outward from the slot and are positioned at uniform distances. The slot and cutout portions of the tracks can receive various types of track fittings. The track fittings can be positioned in the slot and cutout portions of the tracks at various locations along the tracks to detachably secure passenger seats, cargo, and other items to the tracks. In this manner, the passenger seats, cargo, or other items can be attached, relocated, or removed from the aircraft as desired.

Many prior art track fittings, however, do not have sufficient load-carrying capacity and strength or are otherwise deficient to safely and adequately secure aircraft seats, cargo, and other items to the floor of the aircraft when the aircraft crashes or is subject to substantial turbulence, rapid deceleration, or impact forces. Under such conditions, large impact forces, compression forces, tensile forces, bending moments, torque, and/or torsion (twisting), are exerted on the tracks, track fittings, interconnecting bolts, and passenger seats, which can cause the tracks and/or seats to rotate and the bolts to be angularly displaced or become bent or otherwise deformed. Such conditions can also cause the passenger seats to become misaligned and twisted off the tracks, and the track fittings to fail. In some circumstances, the track fittings have actually been pulled loose from the locking tracks. This has resulted in the passenger seat becoming loose from the floor of the aircraft and being propelled within the aircraft which greatly increases the chances of injury or death to the occupants of that seat or other occupants in the aircraft. Such track fittings can be hazardous to the aircraft, dangerous to the safety and well-being of passengers and the flight crew, and harmful to aircraft equipment and cargo.

Over the years a variety of track fittings, passenger seat equipment, and other components have been suggested for aircraft passenger seats and for other purposes. Typifying some of these prior art track fittings, passenger seat equipment, and other components are those found in U.S. Pat. Nos. 3,212,457; 3,606,637; 3,667,195; 3,847,344; 4,026,218; 4,062,298; 4,109,891; 4,230,423; 4,256,424; 4,369,010; 4,376,522; and 4,509,888. These prior art track fittings, passenger seat equipment, and other components have met with varying degrees of success.

It is, therefore, desirable to provide an improved aircraft seat fitting assembly which overcomes most, if not all, of the preceding problems.

SUMMARY OF THE INVENTION

An improved aircraft seat track fitting assembly is provided which increases the safety, stability, and reliability of passenger seat equipment during aircraft turbulence, air pockets, and crashes as well as during normal flight. Desirably, the novel track fitting assembly is economical to manufacture, effective, and dependable. The novel aircraft seat track fitting assembly is also easy to install and use.

Advantageously, the inventive track fitting assembly is specially designed, constructed, and arranged to have enhanced structural strength and increased load-carrying capacity so as to safely accommodate normal loads, substantial rotation and twisting of the track and/or passenger seat, and substantial bending, torque, and/or torsion of the interconnecting seat bolt. The improved track fitting assembly minimizes failure of the passenger seat equipment should the track or passenger seat rotate or the interconnecting seat bolt pivot or become twisted, bent, or otherwise deformed.

Desirably, the novel track fitting assembly enhances the safety of passengers and aircraft personnel and helps protect the cargo and aircraft equipment. The improved track fitting assembly provides similar advantages for passenger seat equipment in trains, ships, buses, vans, and other vehicles.

To this end, the novel aircraft assembly has a fitting with a body that is shaped and arranged for positioning in mating association with a leg of a passenger seat. The fitting is constructed and arranged to rotate about the leg of the passenger seat in a plane perpendicular to the bolt. Track-engaging means, such as track engaging members comprising vertically adjustable footed studs and a clamping member comprising a vertically adjustable wedge, are operatively connected to and extend downwardly from the body of the track fitting to detachably connect and secure the track fitting to a track along the floor. Advantageously, the body of the track fitting is constructed to provide impact resistant means to prevent the track fitting from failing when encountering substantial impact or rotational forces. The body of the track fitting can have a central hole to receive a fastener, such as a bolt or shaft, and the impact resistant means can include an enlarged opening, chamber, or compartment in communication with the hole.

In the preferred form, the track fitting has axially opposite openings to accommodate rotation of the track and/or leg of the passenger seat as well as bending, angular displacement, and/or rotation of the interconnecting seat bolt. The axially opposite openings can flare outwardly and can be conical or trapezoidal in shape. A bushing can be inserted in the central opening to receive the interconnecting seat bolt or other fastener.

The body of the track fitting can be made of metal or can comprise a composite body with metal core and resilient outer skins to cushion and dampen the forces exerted on the track fitting the fastener.

A more detailed explanation of the invention is provided in the following description and appended claims taken in conjunction with the accompanying drawings.

BRIEF DESCRIPTION OF THE DRAWINGS

FIG. 1 is an assembly view of a track fitting in accordance with principles of the present invention;

FIG. 2 is side view of the track fitting attached to a track;

FIG. 3 is a bottom cross-sectional view of the track and track fitting taken substantially along lines 3—3 of FIG. 2;

FIG. 4 is a top view of the track fitting;

FIG. 5 is a cross-sectional side view of the track fitting;

FIG. 6 is cross-sectional side view of the seat track fitting assembly in accordance with principles of the present invention;

FIG. 7 is cross-sectional side view of the seat track fitting assembly with a bushing;

FIG. 8 is cross-sectional side view of the seat track fitting assembly with a bent interconnecting seat bolt;

FIG. 9 is cross-sectional side view of a composite seat track fitting assembly with a bent interconnecting seat bolt;

FIG. 10 is cross-sectional side view of the seat track fitting assembly of FIG. 6 with the track rotated; and FIG. 11 is cross-sectional side view of the seat track fitting assembly of FIG. 6 with the seat leg rotated.

DETAILED DESCRIPTION OF THE PREFERRED EMBODIMENTS

The aircraft seat track fitting assembly 10 of FIG. 6 has a specially designed and arranged passenger seat track fitting 12 which increases the safety, stability, and reliability of passenger seat equipment during aircraft turbulence, air pockets, and crashes as well as during normal flight. The passenger seat track fitting 12 is detachably secured and clamped to an elongated lock track 14. The track 14 can be fastened or otherwise secured to the floor of the aircraft.

The track fitting 12 accommodates, receives and can rotate about the bifurcated leg elements 16 and 18 (FIG. 6) of the downwardly extending leg 20 of a support frame 22 of a single or bench style passenger seat 24 in a plane perpendicular to the axis of an interconnecting seat bolt or shaft 28. The interconnecting seat bolt or shaft 28 connects the leg elements 16 and 18 of the passenger seat to the track fitting 12. The leg 20 can be fabricated of forged or cast metal. Other materials can be used.

The novel track fitting assembly 10 (FIG. 8) has enhanced structural strength and increased load-carrying capacity to safely accommodate normal loads as well as rotation of the track 14, seat leg 20, and/or interconnecting seat bolt 28. The track fitting assembly 10 also safely accommodates large impact forces, compression forces, tensile forces, bending moments, torque, torsion (twisting), fatigue, and wear caused by the interconnecting seat bolt 28 as well as twisting or rotation of the track 14 or seat 24 during severe turbulence or crash conditions.

Advantageously, the improved track fitting assembly 10 minimizes failure of the passenger seat equipment should the track 14 or leg 20 of the seat 24 rotate or the interconnecting seat bolt 28 twist, rotate, bend, or deform from impact forces or crashing of the aircraft. This enhances the safety of passengers and aircraft personnel and helps prevent damage to aircraft equipment and cargo.

While the passenger seat track fitting assembly 10 is described with particular reference to aircraft because it is especially useful and advantageous for aircraft, it also offers similar advantages for passenger seat equipment in trains, ships, buses, vans, and other vehicles.

The track 14 of FIG. 6 is made of metal and has a base 30 with a flat or planar bottom surface which is fastened or otherwise mounted on the floor of an aircraft. The track 14 has an elongated, inverted T-shaped, longitudinally extending channel 32 with an upwardly facing open top portion 34. The channel 32 has an elongated slot 36 (FIG. 3) and a series of uniformly spaced, aliquot, enlarged rounded access openings 38. The top portion 34 of the track 14 has an upwardly facing outer top surface 40 (FIG. 2) and a downwardly facing, interior lower surface or underside 42.

The aircraft seat or chair 24 (FIG. 6) has a metal support frame 22 with downwardly extending, vertical legs 20. Each leg 20 has a lower bifurcated fitting-receiving portion 46. The lower portion 46 of the leg 44 has an n-shaped cross section or an inverted U-shaped cross section. The cross section of the lower portion 46 of the leg 44 has a horizontal crossbar portion or bight 48 and upright leg elements 16 and 18 which extend vertically downwardly from the bight 48. The leg elements 48 have horizontally aligned bolt holes 50 and 52.

The track fitting 12 has a metal body or fitting body 54. The upper portion 56 (FIG. 6) of the body 54 is positioned between the leg elements 16 and 18 to receive and accommodate the leg elements 16 and 18. The upper leg-receiving portion 56 of the body 54 of the track fitting 12 has a bolt-receiving opening, bore, or hole 58 which is horizontally and laterally aligned in registration with the bolt holes 50 and 52 of the leg elements 16 and 18. Bolt holes 50, 52, and 58 slidably receive the interconnecting seat bolt or shaft 28. In the preferred embodiment of FIGS. 1 and 2, the body 54 of the track fitting 12 has an inclined back or slanted upper portion 59 which is inclined toward an enlarged rounded portion 61 about the bolt-receiving opening 58 of the track fitting 12.

The bolt-receiving opening 58 (FIG. 6) of the body 54 of the track fitting 12 includes an intermediate, smaller diameter, central portion 60 and complementary, axially opposite, enlarged diameter, outer portions 62 and 64. The outer portions 62 and 64 of the bolt-receiving opening 58 are positioned in horizontal coaxial alignment with each other and with the intermediate central portion 60 of the bolt-receiving opening 58. As best shown in FIG. 6, the outer portions 62 and 64 of the bolt-receiving opening 58 are positioned on opposite transverse sides of said central portion 60 of the bolt-receiving opening 58. Advantageously, the outer portions of the bolt-receiving opening 58 have a substantially larger maximum diameter that the both the maximum diameter of the central portion 60 of the bolt-receiving opening 58 and the shank of the bolt or shaft 28, and provide bent and rotated bolt-receiving chambers or compartments 62 and 64 (FIG. 8). The bolt-receiving chambers of compartment 62 and 64 accommodate substantial rotation, angular displacement, axial (longitudinal) pivoting, bending and/or deformation of the shank of the interconnecting seat bolt or shaft 28, such as when the track 14 is rotated as in FIG. 10, or the leg elements 16 and 18 are rotated as in FIG. 11, or the bolt or shaft 28 is bent as in FIG. 8.

It has been unexpectedly and surprisingly found through a series of tests that the above arrangement substantially minimizes failure of the aircraft seat track fitting assembly and enhances the overall load-carrying capacity of the aircraft seat track fitting assembly.

In the preferred embodiment, the outer portions 62 and 64 of the bolt-receiving opening 58 diverge and are flared outwardly to accommodate rotation, bending, and twisting of the track 14, bolt 28, and/or seat 24. Desirably, the outer portions 62 and 64 of the opening 58 are flared outwardly at an angle of at least 10 degrees, preferably from 10 to 20 degrees, and are conical or trapezoidal shaped. The conical or trapezoidal, flared outer portions 62 and 64 of the opening 58 also allow the track fitting 12 to rotate with the track 14 as shown in FIG. 10. If desired, the flared outer portions 62 and 64 of the bolt-receiving opening 58 can comprise a conical opening, a trapezoidal opening, a chamfered opening, a countersunk opening, a tapered opening, a beveled opening, a concave opening, or a convex opening.

In the embodiment of FIG. 7, the composite track fitting 12 has an impact-resistant bolt-receiving bushing 70 which is press fit in an interference fit in the central portion 60 of the bolt-receiving opening 58. The bushing 70 can be made of metal or impact-resistant plastic and has about the same axial length as the central portion 60 of the bolt-receiving opening 58. The bushing 70 can also be split and snap fit into a recessed channel or groove comprising the central portion 60 of the bolt-receiving opening 58. The tubular bushing 70 has a horizontal and lateral axially extending opening 72 to slidably receive and minimize rattling and vibrations of the interconnecting seat bolt or shaft 28. The bolt-receiving opening 72 of the bushing 70 is in coaxial alignment with the outer portions 62 and 64 of the bolt-receiving opening 58 of the track fitting 12 and the bolt holes 50 and 52 of the leg elements 16 and 18. The bolt-receiving opening 72 of the bushing 70 has a maximum diameter substantially smaller than the maximum diametric span (diameter) of the outer bent and rotated bolt-receiving chamber or compartment 62 and 64 comprising the outer portions of the bolt-receiving opening 58 of the track fitting.

As shown in FIGS. 1 and 5, the track fitting 12 has a parallel pair of vertically adjustable, upright track-engaging members 80 and 82 which are operatively connected and threadedly engaged to upright internally threaded holes 84 and 86 in the lower portion 88 of the body 54 of the track fitting 12. The track-engaging members 80 and 82 extend vertically downwardly from the body 54 of the track fitting 12. Preferably, each of the vertical track-engaging members 80 and 82 comprise a threaded rod or stud 90 with an enlarged foot 92 extending downwardly from the bottom or the rod or study 90. The threaded rod or stud 90 has a smaller diameter than the slot 36 (FIG. 3) of the track 14 to enable the threaded rod or stud 90 to slide along the slot 36 of the track 14. The foot 92 of each track-engaging member can comprise a mushroom-shaped pad with a upper engagement portion 94 (FIG. 5) which can be tapered, arched, or convex. The upper portion 94 of the foot 92 releasably abut against and securely engage the underside 42 (FIG. 2) of the top portion 24 of the track 14. The maximum span and diameter of the foot 92 is smaller than the access openings 38 (FIG. 3) of the track to enable the foot 92 to enter an access opening and the channel 32 of the track 14, but is larger than the slot 36 of the track 14 to prevent the foot 92 from passing upwardly through the slot 36 except through an access opening 38 in the track 14.

The track fitting 12 (FIGS. 1 and 5) preferably also has a vertically adjustable, intermediate clamping member or clamp 100 which is positioned between the track-engaging members 80 and 82. The vertical clamping member 100 is operatively connected and threadedly engaged to an upright internally threaded hole 102 (FIG. 1) extending vertically through the middle portion of the body 54 of the track fitting 12. The clamping member 100 extends vertically downwardly from the body 54 of the track fitting 12. The clamping member can comprise an upright threaded lock screw portion or stud 104 (FIG. 1) with a rounded enlarged foot 106 extending downwardly from the bottom of the upright threaded lock screw portion or stud 104. The foot 106 of the clamping member 100 has diametrically opposed, concave portions 108 and 110 (FIG. 3) positioned adjacent the studs 90 of the track-engaging members 80 and 82 to accommodate vertical movement of the track-engaging members 80 and 82. The bottom of of the foot 106 of the clamping member 100 serves as a wedge to releasably wedge, abut against, and securely engage the top surface 40 of the track 14 as shown in FIG. 2. The maximum span of the foot 106 of the clamping member 100 is greater than the maximum span of the slot 36 and access openings 38 of the track 14 to prevent the clamping member from entering the channel 32 of the track 14.

As shown in FIGS. 1 and 5, the clamping member 100 has a lower unthreaded portion 112 which is secured to the foot 106 of the clamping member 100. The wedge or foot 106 can have a ledge or shoulder 114 (FIG. 1) which wedges against the upper surface 40 of the track 14. When the track fitting 12 is in the unlocked position, the shoulder comes in contact with the recessed underside 115 (FIG. 1) of the track fitting 12 to prevent the locking screw member 104 from unscrewing past a fixed position. A further explanation of the wedge (wedge member) is described in detail in U.S. Pat. No. 4,230,432 which is hereby incorporated by reference in its entirety.

The clamping member 100 (FIG. 1) can comprise an assembly with a washer or retainer ring 116 to help retain and connect the foot (wedge) 106 to the screw member 104. In order to facilitate locking of the clamping member 100 within the vertical threaded hole 102 of the track fitting 12, the threaded portion 104 of the clamping member 100 can have a external nylon or plastic locking member extending into threads of the threaded portion 104 or a set screw 117 can extend through a lateral threaded hole 118 in the body 54 of the track fitting 12 to engage the threaded portion 104 of the clamping member 100.

The clamping member 100 (FIG. 2) cooperates with the track-engaging members 80 and 82 to securely clamp and detachably connect the track fitting 12 to the track 14.

As shown in FIG. 6, the interconnecting seat bolt or shaft 28 comprises a metal fastener which passes through the bolt holes 50 and 52 of the leg elements 16 and 18 and the bolt-receiving opening 58 of the track fitting 12. The fastener 28 has a much smaller maximum diameter than the bent bolt-receiving chamber or compartments 62 and 64 comprising the axially opposite outer portions of the bolt-receiving opening 58 to permit the fastener 28 to safely rotate, pivot, bend, twist, or deform, as shown in FIGS. 8, 10, and 11, upon rotation of the track 14 or seat let 20 or upon substantial impact of the fastener 28 so as to securely maintain the connection between the fastener 28, track fitting 12, seat 24, and track 14.

The composite track fitting 120 of FIG. 9 is similar to the track fitting 12 of FIGS. 1-6, except that track fitting 120 of FIG. 9 has a composite body 122 with an intermediate metal core 124 and resilient outer skins 126 and 128. The outer skins 126 and 128 comprise lateral opposite outer shells or resilient outer protective surfaces. The outer skins 126 and 128 can be made of an elastomeric material, such as rubber or impact-resistant plastic. The outer skins 126 and 128 helps dampen, absorb, and disperse the compressive forces, impact forces, bending forces, rotational forces, torque, and torsion, exerted by the interconnecting bolt or shaft 28, track 14, or seat leg 20 on the track fitting 120.

In use, the feet 92 of the track-engaging members 80 and 82 are placed into the desired access openings 38 of the track 14 and the track fitting 12 is slid along the channel 32 of the track 14 until reaching the desired location between the track's access openings 38. When the track fitting 12 is in this location it cannot be pulled upward away from the track 14 since the feet 92 of the track-engaging members 80 and 82, positioned below the slot 36 of the track 14, are larger than the track 14. The track fitting 12 is locked to the track 14 by screwing the locking screw member 104 downwardly until the underside of the track wedge member 106 wedges against the top of the track 14.

The track fitting 12 can be readily removed from the track 14 to remove or relocate the passenger seat, cargo, or other item by simply reversing the above procedure.

If it is desired to reposition the passenger seat, cargo, or other item along the same track 14, the track fitting 12 can be loosened and unlocked by unlocking the clamping member 100. This can be accomplished by rotating the locking screw member 104 in a suitable direction so that the lower portion of the wedge 106 is retracted and spaced above the track 14. This can permit the track fitting 12 and any connected passenger seat, cargo, or other item to be slid along the upper surface of the track 14 to another location along the track 14.

Among the many advantages of the novel track fitting assembly are:
1. Superior load-carrying capacity.
2. Excellent structural strength and integrity.
3. Outstanding resistance to failure during crash conditions and normal travel.
4. Greater safety for passengers and flight personnel.
5. Improved protection for cargo and aircraft equipment.
6. Simple to use.
7. Easy to install and remove.
8. Convenient.
9. Economical.
10. Reliable.
11. Effective.
12. Efficient.

Although embodiments of the invention has been shown and described, it is to be understood that various modifications and substitutions, as well as rearrangements of parts and process steps, can be made by those skilled in the art without departing from the novel spirit and scope of this invention.

What is claimed is:

1. A track fitting, comprising:

a composite fitting body having means for matingly receiving a leg of a passenger seat;

track-engaging means comprising a bolt connected to said composite fitting body for detachably connecting said composite fitting body to a track;

said composite fitting body defining a bent bolt-receiving compartment for receiving and accommodating substantial bending and deformation of said bolt, said bent bolt-receiving compartment comprising a left outwardly flared conical opening, a right outwardly flared conical opening, and an intermediate central opening positioned between said communicating with said left and right, outwardly flared conical openings, and said conical openings having a substantially greater maximum diameter than said intermediate central opening; and said composite fitting body comprising a metal core with upright sides having undercut portions and resilient laterally opposite shells providing resilient outer protective surfaces positioned in said undercut portions about, adjacent, and in communication with said conical openings so that said resilient outer protective surfaces define outer portions of the conical openings for substantially dampening impact and bending forces exerted by said bolt on said composite fitting body.

2. An aircraft seat track fitting assembly, comprising:

a body having an upper portion shaped generally complementary to a leg of an aircraft seat for positioning in mating association with said leg of said aircraft seat;

at least one track-engaging member extending generally downwardly from said body, said track-engaging member having a foot for lockably positioning within a channel of a track;

a clamping member operatively connected to said body for securely engaging the top of said track, said clamping member cooperating with said track-engaging member to releasably and fixedly secure said body to said track;

said body defining a substantially horizontal rotated bolt-receiving chamber extending transversely through said upper portion and aligned in registration with bolt holes in said leg, said rotated bolt-receiving chamber having a recessed channel comprising a smaller diameter central opening for receiving a bolt and having diametrically opposite, outwardly diverging conical openings located on axially opposite sides of said central opening, said enlarged diameter sections being substantially larger then said central portion and the maximum diameter of said bolt for accommodating bending, rotation, twisting, and deformation of said bolt during air pockets, jolts, or crashing of said aircraft or upon rotation of said track or seat to safely secure and substantially minimize separation of said seat from said body;

an impact resistance split bushing positioned in press fitting engagement in said recessed channel between said conical openings and defining a bolt-receiving opening for slidably receiving and substantially minimizing rattling and vibrations of said bolt; and said conical openings having a substantially larger diametric span than said bolt-receiving opening of said split bushing.

3. An aircraft seat track fitting assembly in accordance with claim 2 wherein said body comprises a composite body with an intermediate metal core and laterally opposite outer resilient skins, said skins comprising an elastomeric material consisting of rubber and impact-resistant plastic for dampening said compressive and impact forces.

4. An aircraft seat fitting assembly, comprising:

a fitting body having an upper leg-receiving portion for matingly fitting between leg elements of an aircraft seat;

a pair of vertically adjustable, upright track-engaging members operatively connected to and extending downwardly from said body, each of said track-engaging members comprising a threaded stud for slidably engaging a slot of a track and an enlarged foot extending downwardly from said stud, said foot being smaller than at least one access opening of said track but larger than said slot and said foot having an upper engagement surface for releasably abutting against and securely engaging a slotted portion of said track;

a vertically adjustable intermediate clamping member positioned between said track-engaging members and operatively connected to and extending downwardly from said body, said clamping member comprising an upright threaded lock screw portion and an enlarged foot portion providing a wedge for releasably wedging and securely engaging an upper surface of said track;

said clamping member cooperating with said track-engaging members for releasable interlocking engagement with said track to detachably connect said fitting body to said track; and said body defining a rotated bolt-receiving compartment extending laterally through said upper leg-receiving portion, said rotated bolt-receiving compartment including an intermediate smaller diameter central hole and outwardly diverging, axially opposite enlarged diameter outer symmetrical conical-shaped holes, said axially opposite outer conical-shaped holes being in substantial coaxial alignment with each other and said intermediate central hole, said outer symmetrical conical-shaped holes being positioned on axially opposite sides of said central hole, each of said axially opposite outer conical-shaped holes having a substantially larger diameter that the maximum diameter of said central hole and a bolt for accommodating substantial bending, angular displacement, and deformation of said bolt when said aircraft encounters substantial compressive and impact forces to substantially minimize failure of the aircraft seat track fitting assembly and enhance the overall load-carrying capacity of the aircraft seat track fitting assembly.

5. An aircraft seat track fitting assembly in accordance with claim 4 wherein said body comprises a composite body with an intermediate metal core and upright laterally opposite outer shells, said shells comprising an elastomeric material selected from the group consisting of rubber and impact-resistant plastic, and said upright laterally opposite outer shells positioned about and defining part of said conical holes for dampening said compressive and impact forces.

6. An aircraft seat track fitting assembly in accordance with claim 4 including a split bolt-receiving bushing snugly positioned in said central hole between said conical holes, said split bushing comprising a material selected from the group consisting of metal and impact-resistant plastic.

7. An aircraft seat fitting assembly, comprising:

elongated track having a base for mounting on the floor of an aircraft, said track having an inverted substantially T-shaped longitudinally extending channel with an upwardly facing open top portion, said channel defining an elongated slot and a series of enlarged rounded access openings, said top portion having an upwardly facing outer top surface and an underside providing a downwardly facing interior lower surface;

a chair comprising an aircraft passenger seat with downwardly extending legs, each of said legs having a lower bifurcated fitting-receiving portion, said lower bifurcated fitting-receiving portion having an inverted, substantially U-shaped cross section with a bight and upright leg elements extending substantially downwardly from said bight, and said leg elements defining aligned bolt holes;

a track fitting having a body with an upper leg-receiving portion positioned between said leg elements, said leg-receiving portion defining a belt-bolt-receiving chamber aligned in registration with said bolt holes of said leg elements, said bolt-receiving chamber comprising an intermediate smaller diameter central hole and conical axially opposite enlarged diameter outer opening, said conical axially opposite outer openings being in substantial coaxial alignment with each other and intermediate central portion, said outer openings being positioned on opposite transverse sides of said central hole and having a substantially larger diameter that said central hole, said fitting including a pair of vertically adjustable, upright track-engaging members operatively connected to and extending downwardly from said body and a vertically adjustable intermediate clamp member positioned between said track-engaging members and operatively connected to and extending downwardly from body, each of said track-engaging members comprising a threaded stud for slidably engaging said slot of said track and an enlarged foot extending downwardly from said stud, said foot being smaller than said access openings and larger than said slot and having an upper engagement surface for releasably abutting against and securely engaging said lower surface of said track, said clamp member comprising an upright threaded lock screw portion and an enlarged foot portion providing a wedge for releasably wedging and securely engaging said top surface of said track, and said clamp member cooperating with said track-engaging member for releasable interlocking engagement with said track to detachably connect said fitting to said track; and a fastener for connecting said track fitting to said aircraft passenger seat, said fastener comprising a bolt with an elongated shank, said shank passing through and positioned in said bolt holes of said leg elements and said bolt-receiving opening of said fitting, and said shank having a maximum diameter substantially smaller than the maximum diameter of said axially opposite enlarged diameter outer conical openings of said bolt-receiving opening for permitting said shank to safely bend, pivot, twist, and deform upon substantial impact of said aircraft so as to securely maintain the connection of said fastener between said track fitting and said aircraft passenger seat.

8. An aircraft seat track fitting assembly in accordance with claim 7 wherein said body comprises a composite body with an intermediate metal core having undercut portions and laterally opposite resilient outer protective surfaces positioned in said undercut portions, said laterally opposite resilient outer protective surfaces comprising an elastomeric material selected from the group consisting of rubber and impact-resistant plastic for dampening and absorbing forces exerted by said fastener on said track fitting.

9. An aircraft seat track fitting assembly in accordance with claim 7 including an impact-resistant split bushing securely engaged in an interference fit in said central opening of said bent bolt-receiving chamber of said track fitting between said conical openings, said bushing defining a lateral, axially extending opening for slidably receiving said bolt and said lateral axially extending opening having a maximum diameter substantially smaller than the maximum diametric span of said diverging conical openings of said bent bolt-receiving chamber of said track fitting.

* * * * *